United States Patent
Rodriguez

(10) Patent No.: US 7,142,331 B2
(45) Date of Patent: Nov. 28, 2006

(54) CORRECTION OF PULSE WIDTH ACCUMULATOR BASED ON THE IMAGE TYPE BEING PRINTED

(75) Inventor: Santiago Rodriguez, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 886 days.

(21) Appl. No.: 09/928,503

(22) Filed: Aug. 14, 2001

(65) Prior Publication Data
US 2003/0035134 A1   Feb. 20, 2003

(51) Int. Cl.
B41J 1/00 (2006.01)
G06K 15/00 (2006.01)

(52) U.S. Cl. ..................... 358/3.06; 358/1.15

(58) Field of Classification Search ............... 358/1.1, 358/1.7, 1.9, 1.15, 3.01, 3.06, 3.09, 3.12; 347/251, 252
See application file for complete search history.

(56) References Cited

U.S. PATENT DOCUMENTS 4,709,250 A * 11/1987 Takeuchi ................. 347/131
5,581,358 A * 12/1996 Seto et al. ................ 358/3.24
5,617,216 A *  4/1997 Wada ...................... 358/2.1
5,999,704 A * 12/1999 Hirao ...................... 358/2.1

FOREIGN PATENT DOCUMENTS

EP    0802667 A2    10/1997

* cited by examiner

Primary Examiner—Thomas D. Lee

(57) ABSTRACT

The invention includes a method, a computer readable medium and an apparatus for correcting a half tone pulse width count. In one respect, the invention includes a method for correcting a half tone pulse width count. The method comprises determining the half tone pulse width count, determining a half tone level, and calculating a corrected pulse width count based on the half tone pulse width count and the half tone level. In another respect, the invention includes a computer readable medium on which is embedded computer software capable of automatically correcting a half tone pulse width count. The software performs the above method. In yet another respect, the invention includes an apparatus for performing the above method.

16 Claims, 3 Drawing Sheets

CORRECTION OF PULSE WIDTH ACCUMULATOR BASED ON THE IMAGE TYPE BEING PRINTED

FIELD OF THE INVENTION

This invention relates generally to printing, and more particularly to estimation of toner usage.

BACKGROUND OF THE INVENTION

It is generally known that electrophotographic printers utilize toner to generate text and/or images on a print medium, such as, paper. In this regard, a toner cartridge is typically employed to store the toner. In the event the toner cartridge runs out of toner in the middle of a print job, paper and time may be wasted and users may become frustrated. Thus, to insure sufficient quantities of toner for a print job, sensors are often utilized to measure the toner level. However, sensors are expensive. In this regard, methods of toner estimation may be employed.

Previous inventions have disclosed methods of estimating toner usage for a print job. Typically, the toner usage is estimated for each print job. If the estimate indicates that insufficient toner is remaining in the cartridge, a user may be notified. For example, U.S. Pat. No. 5,802,420 discloses a method of predicting toner usage based upon printing history. For example, if a certain amount of toner was used to print the last 10 pages, the next 10 pages is estimated to use that same amount. U.S. Pat. No. 5,937,255 discloses a method of estimating toner usage based upon a pixel count. For example, if "T" amount of toner is used to generate one pixel, then 100 pixels is estimated to use 100×T amount of toner.

However, different pixels may not utilize the same amount of toner. For example, in the assignee's HP Monochrome and Color LaserJet™, a laser light source is modulated as it scans across the surface of an optical photoreceptor ("OPR"). To create a pixel, the laser light source may be modulated (or pulsed) to illuminate a desired pixel location. However, the pixel does not represent a fixed quantity of toner. For each pulse, the length of time (or duration) the laser is on as it scans across the OPR correlates to the width of the pulse on the OPR surface. The width and number of pulses used to create a pixel may vary from one pixel to another pixel. For example, to produce certain fine details, it may be advantageous to produce relatively narrow pixels. Thus, the duration of the pulse used to create the relatively narrow pixel may be correspondingly short. Conversely, relatively wider pulses may be used to produce a substantially solid line across the page.

Moreover, even for a given sized pixel, the amount of toner used may vary from pixel to pixel. For example, the number of pulses used to create a pixel may differ from pixel to another. A first pixel may be produced with a single pulse. A second pixel may be produced with more than one pulses. However, the first and second pixel may be substantially the same size despite using varying amount of toner based on the number of pulses.

SUMMARY OF THE INVENTION

The invention includes a method, a computer readable medium and an apparatus for correcting a half tone pulse width count.

In one respect, the invention includes a method for correcting a half tone pulse width count. The method comprises determining the half tone pulse width count, determining a half tone level, and calculating a corrected pulse width count based on the half tone pulse width count and the half tone level.

In another respect, the invention includes a computer readable medium on which is embedded computer software capable of automatically correcting a half tone pulse width count. The software comprises determining the half tone pulse width count, determining a half tone level, and calculating a corrected pulse width count based on the half tone pulse width count and the half tone level.

In yet another respect, the invention includes an apparatus for correcting a half tone pulse width count. The apparatus comprises a processor system configured to determine the half tone pulse width count for one or more pixels within a print job, wherein the processor system is further configured to determine a half tone level for the one or more pixels and wherein the processor system is further configured to calculate a corrected half tone pulse width count based on the half tone pulse width count and the half tone level.

In comparison to known prior art, certain embodiments of the invention are capable of achieving certain advantages, including some or all of the following: (1) accurate estimation of toner usage; (2) less expensive; (3) capable of being decentralized and (4) more robust. Those skilled in the art will appreciate these and other advantages and benefits of various embodiments of the invention upon reading the following detailed description of a preferred embodiment with reference to the below-listed drawings.

DETAILED DESCRIPTION OF A PREFERRED EMBODIMENT

Figure 1:
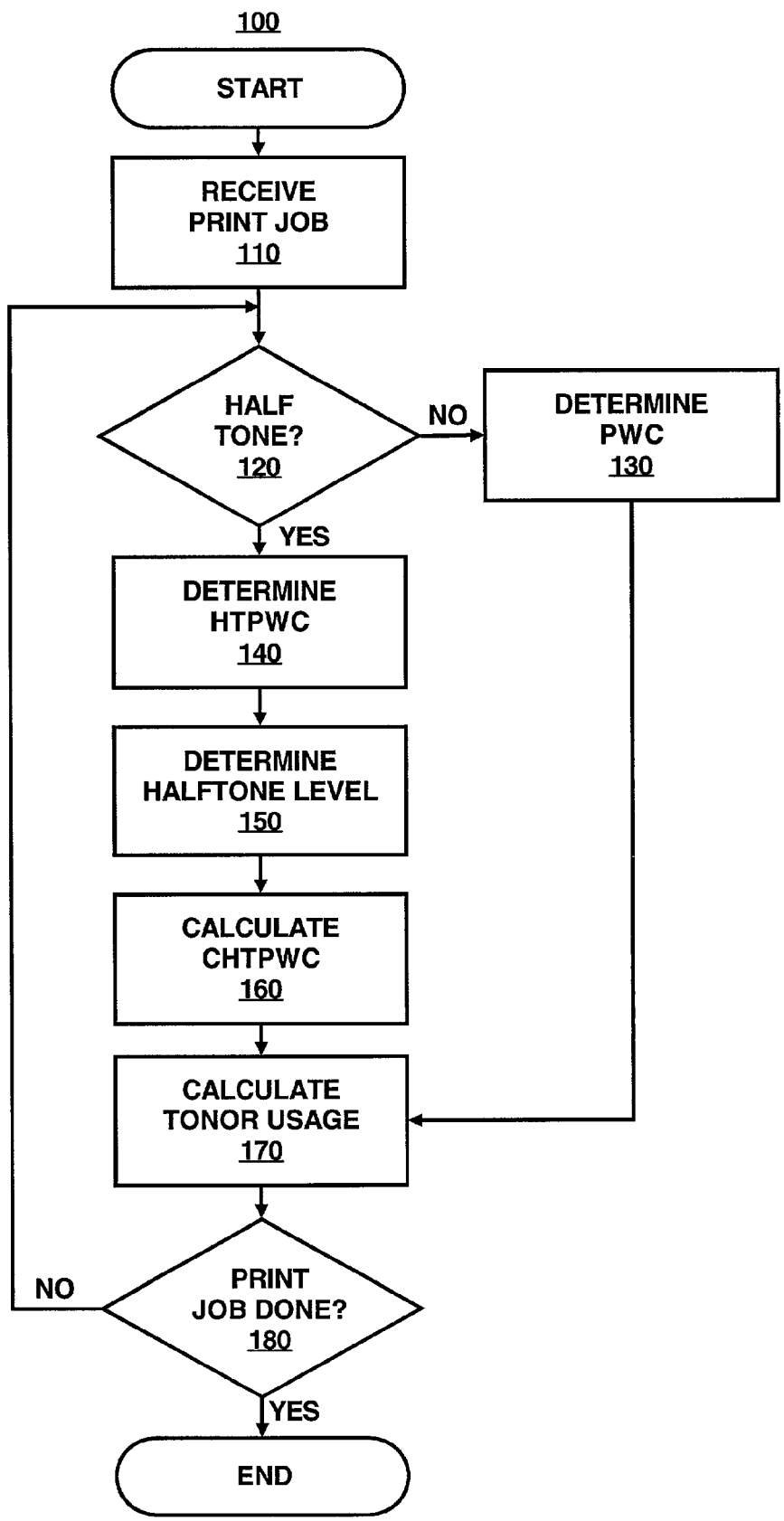
FIG. 1 is a flow chart of a method, in accordance with a manner in which an embodiment of the invention may be practiced.

For simplicity and illustrative purposes, the principles of the invention are described by referring mainly to an exemplary embodiment thereof, particularly with references to a system to laser printer. However, one of ordinary skill in the art would readily recognize that the same principles are equally applicable to, and may be implemented in, a system capable of utilizing colorant (e.g., toner, ink, pigment, dye, et.) to produce text and/or one or more images on a print medium, and that any such variations are within the scope of the invention. Furthermore, the same principles are equally applicable to, and may be implemented in, a system capable of utilizing a material (e.g., metal, plastic, resin, wax, etc.) to produce a substantially, two dimensional image or a three dimensional object.

A print job, as described herein, may include text, solid lines, and/or half tones. When printing text or a solid line (e.g., a line drawing) in a document, a relatively large pulse width count ("PWC") is accumulated as compared to printing a half tone (e.g., a half tone image or shading). The PWC is a measure of the accumulated width of pulses. Due to the fact that pixels may not represent fixed units of toner usage, the PWC correlates to the amount of toner transferred more accurately than an accumulated count of pixels and/or dots. While in a preferred form the PWC is accumulated per page, the PWC may be accumulated per pixel, per scan line, per page, per print job, per usable lifespan of the toner cartridge, etc. As will be shown below, the PWC may be adjusted to improve toner usage correlation.

Additionally, the print job is typically initiated by a user operating a computer or terminal on the local area network ("LAN") in which a printer is located. However, it is within the scope of this invention that the print job may be received in any manner known to those skilled in the art. For example, the printer may be directly attached to a computer. Furthermore, it is within the scope of this invention that the printer and the print job input device (e.g., keyboard, scanner, etc.) be a single device. For example, and electronic typewriter and/or "all in one device", such as a printer/copier/fax machine.

Half tones are typically used to create shading and images by basically altering the perception of color intensity by manipulating the density of a pattern of dots (i.e., the half tone level). For example, at a half tone level of about 100%, the color of a high density of black dots may be perceived as black. However, at a half tone level of about 10%, a low density of black dots may be perceived as light gray. While pixels are often thought of as dots, for the purpose of this disclosure, a pixel may be a dot or a cluster of sub-pixel sized dots. When printing a relatively high resolution half tone image, a pixel may be produced with as many as 255 dots, each dot being the result of a pulse. Typically, when printing a half tone image, the dots do not touch one another, however, as the half tone level increases, the proximity of one dot to another may decrease.

It is a phenomenon of the electrophotographic process that, for a given pulse width, varying the number of substantially isolated dots results in a non-linear amount of toner transfer. This phenomenon is called the edge effect. Due to the edge effect, and as illustrated by an exemplary graph in FIG. 3, toner usage per pixel is altered as a function of half tone level. For example, the PWC associated with the printing of half tone pixels (e.g., half tone PWC or "HTPWC") may be adjusted based on the image type (i.e., the half tone level) to obtain a corrected HTPWC ("CHTPWC"). Estimation of toner usage utilizing CHTPWC correlates to actual toner usage as much as 50% more accurately than pixel counting alone.

FIG. 1 is a flow chart of a method 100, in accordance with a manner in which an embodiment of the invention may be practiced. As depicted in FIG. 1, the method 100 is initiated in response to receiving a print job in step 110. While in a preferred form, the method 100 may be performed during the printing of the print job, it is within the scope of the invention that the method 100 be at any time after receiving the print job.

In step 120, the print job or corresponding printer specific commands generated in response to the print job may be referenced to determine if one or more half tone pixels are being printed. If it is determined that one or more essentially solid pixels (e.g., when printing text, solid lines, etc.) are being printed, the method 100 may proceed to step 130 to determine one or more PWCs. If it is determined that one or more half tone pixels are being printed, the method 100 may proceed to step 140 to determine one or more HTPWCs.

In the event substantially solid pixels are being generated, in step 130, PWCs are accumulated. The PWCs may be accumulated for the subset of content utilizing substantially solid pixels. The PWCs may be accumulated based on the print job or corresponding printer specific commands generated in response to the print job.

A PWC for each substantially solid pixel may be determined. An accumulated PWC for each scanned line may be determined in a variety of ways. For example, if a subset of pixels produced in a scan line are substantially solid pixels, the PWCs of those substantially solid pixels may be summed within the PWC of the respective scan line and, as described in step 140, a separate HTPWC may be summed for any half tone pixels within the scan line. In another example, a scan line PWC may be summed from the PWCs of any substantially solid pixels along with any corrected HTPWCs of half tone pixels.

An accumulated PWC for each page may be determined in a variety of ways. For example, the PWCs of the substantially solid pixels within the page may be summed. In another example, some combination of PWCs of substantially solid pixels and/or scan lines within the page may be summed. In a similar manner to the determination of accumulated page PWCs, PWCs for the print job and/or the usable lifespan of the toner cartridge PWCs may be determined. Following step 130, toner usage may be determined in step 170.

In the event half tone pixels are being generated, in step 140, HTPWCs may be accumulated. The HTPWCs may be accumulated for the subset of content utilizing half tones. The HTPWCs may be accumulated based on the print job or corresponding printer specific commands generated in response to the print job. The HTPWCs may be determined at the time the print job is generated, after the print job has finished printing, and/or any time in between.

A HTPWC for each half tone pixel may be determined. An accumulated HTPWC for each half tone scanned line may be determined in a variety of ways. For example, if a subset of pixels produced in a scan line are half tone pixels, the HTPWCs of those half tone pixels may be summed within the HTPWC of a respective half tone scan line and, in step 130, a separate PWC may be summed for any substantially solid pixels within the scan line. In another example, the HTPWCs of any half tone pixels may be corrected, as described below in step 160, and summed along with PWCs, determined in step 130, of any substantially solid pixels within the respective scan line.

An accumulated HTPWC for each page may be determined in a variety of ways. For example, the HTPWCs for the half tone scan lines within the page may be summed. In another example, the HTPWCs of the half tone pixels within the page may be summed. In yet another example, some combination of HTPWCs of half tone pixels and/or half tone scan lines within the page may be summed. Additionally, the HTPWCs of half tone pixels and/or half tone scan lines may be corrected, as described below in step 160, and summed with any PWCs determined in step 130. In a similar manner to the determination of accumulated half tone page PWCs, PWCs for the print job and/or the usable lifespan of the toner cartridge PWCs may be determined. Following step 140, the method 100 may proceed to step 150.

In step 150, an associated half tone level may be determined based on the print job or corresponding printer specific commands generated in response to the print job. The steps 130, 140 and 150 need not be performed in the order as shown in FIG. 1, but rather, the steps 130, 140 and 150 may be performed in the opposite order, simultaneously, or any variation therein.

In step 160, the method 100 may determine a number of CHTPWCs. To determine CHTPWCs, the HTPWCs determined in step 140 and the associated half tone level values determined in step 150 may be referenced in conjunction with a look up table ("LUT"), such as, the LUT disclosed in U.S. Pat. No. 5,793,406 and is herein incorporated by reference. Additionally or instead of the LUT, a statistical regression equation ("SRE") substantially the same as the SRE used to generate the LUT may be used to determine the CHTPWCs without departing from the scope of the invention. In general, the LUT may be thought of as a predetermined or static SRE that is less resource intensive than the SRE but less capable of adjustability. A combination of LUT and SRE may be incorporated in such a way as to utilize the LUT for common HTPWCs, thus saving system resources and increasing print speed. The SRE may be utilized for uncommon HTPWCs to increase accuracy of toner estimation. Moreover, the SRE and/or the LUT may take into account the following factors: system design, toner chemistry, OPR sensitivity, HTPWC, associated half tone level, pixel count, temperature, relative humidity, empirical data, etc.

The associated half tone level may be utilized to determine the CHTPWC for each half tone pixel. The CHTPWC for each half tone pixel may be added to previously determined CHTPWCs to generate a CHTPWC for each scanned line. A CHTPWC for each page may be calculated by adding the values of all of the scan lines of the page. An accumulated print job CHTPWC may be generated by adding all of the page values together. Additionally, a CHTPWC for the toner cartridge may be determined by maintaining an accumulated CHTPWC for the usable lifespan of the toner cartridge.

In step 170, one or more toner usage values may be calculated. Toner usage values may be calculated based on any PWCs determined in step 130 in conjunction with any CHTPWCs determined in step 160. In a preferred form, a toner usage value for the usable lifespan of the toner cartridge may be maintained by the addition of toner usage values for each page. Additionally, associated half tone levels, HTPWCs, CHTPWCs, PWCs, pixel counts, and/or toner usage values may be stored to non-volatile memory in step 170.

In step 180, it is determined if the method 100 has reached the end of the print job or the corresponding printer specific commands generated in response to the print job. For example, if an end of file marker is encountered, the method 100 may terminate. If it is determined that the end of the print job or the corresponding printer specific commands generated in response to the print job has not been reached, the method 100 may return to step 120.

Figure 2:
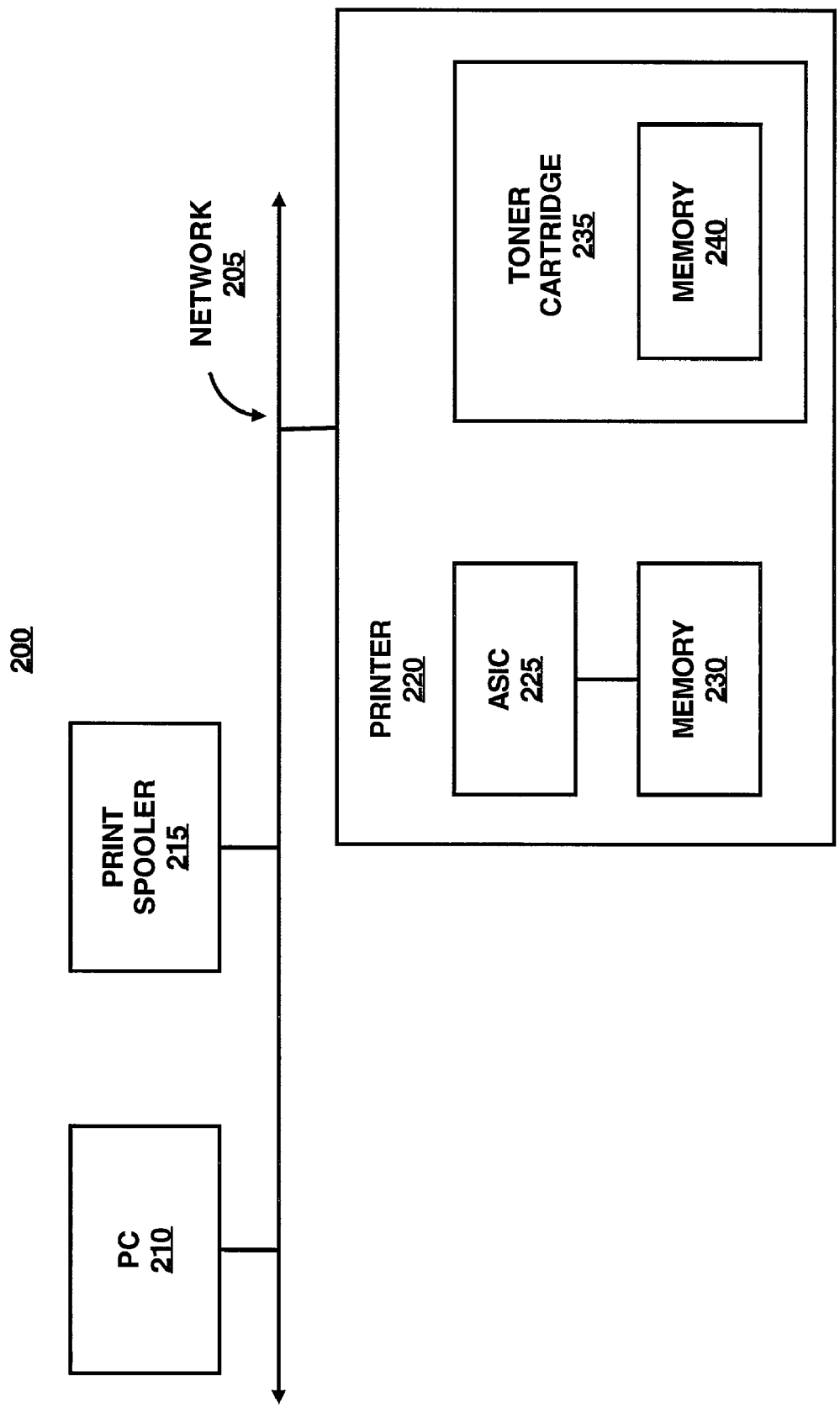
FIG. 2 is a block diagram of a system, in accordance with an embodiment of the invention described in FIG. 1.

FIG. 2 is a block diagram of a system 200, in accordance with an embodiment of the invention described in FIG. 1. Accordingly, the following description of FIG. 2 will be made with particular reference to FIG. 1. As shown in FIG. 2, the system 200 includes a network 205. The system 200 further includes a PC 210, a print spooler 215 and a printer 220 configured to communicate via the network 205. Additionally, the system 200 may include other components configured to communicate via the network 205, such as, routers, servers, other PCs, other printers, etc. Moreover, the system 200 may be configured to communicate with the Internet via the network 205.

The PC 210 may be configured to provide the capability to generate a print job as described in step 105 of FIG. 1. The print job may be forwarded to the print spooler 215 across the network 205. In another form, the PC 210 may be directly connected to the printer 220. Although not shown in FIG. 2, the printer 220 and the PC 210 may be a single device. For example, an electronic typewriter. Furthermore, it is within the scope of the invention that the printer 220 may be an "all in one device", such as a printer/copier/fax machine. Additionally, the PC 210 may be configured to receive information from components of the network 205.

The print spooler 215 may be configured to accept the print job via the network 205. The print spooler 215 may further be configured to forward the print job to the printer 220 and/or store the print job until the printer 220 is ready to accept it. Typically, the print job is forwarded as a stream of bits corresponding to how each page of the print job appears and, in a process described in more detail below, the printer 220 computes specific printer commands (e.g., laser pulse modulation). However, it is within the purview of the invention that the specific printer commands may be generated by the PC 210, the print spooler 215, the printer 220, and/or various other components configured to communicate via the network 205. Additionally, the CHTPWC, the pixel count, a toner remaining value, and the toner usage values may be generated by the PC 210, the print spooler 215, the printer 220, and/or various other components configured to communicate via the network 205.

According to a preferred embodiment illustrated in FIG. 2, the printer 220 is a laser printer. In other words, the printer 220 utilizes a modulated laser to alter the electrostatic charge on an OPR in an electrophotographic process known to those skilled in the art. According to the principles of the invention, a number of different types of laser printers may be utilized for proper operation of the invention. Additionally, the term "laser printer" is not intended to be a limitation, but rather, with respect to the disclosure, describes a printer in which toner or ink is applied to the surface of a material in the form of pixels. Thus, it is within the purview of this invention that any known printer capable of suitably varying the width and/or half tone level of pixels may be substituted for the printer without departing from the scope of this invention.

The printer 220 includes an application specific integrated circuit ("ASIC") 225. The ASIC 225 may be configured to send and receive information (e.g., printer identity, printer specific commands, toner remaining, the print job, etc.). The ASIC 225 may further be configured to store the print job to a memory 230. The ASIC 225 may further be configured to convert the print job into specific printer commands. A memory 230 within the printer 220 and connected to the ASIC 225 may be configured to store data for the ASIC 225. The data may include the print job, specific printer commands, PWC, HTPWC, half tone level, CHTPWC, pixel count, etc.

The printer 220 may include a toner cartridge 235. The toner cartridge 235, being filled with a predetermined amount of toner, may be configured to dispense a measured amount of toner as required. The toner cartridge 235 may include a memory 240. The memory 240 may be non-volatile, for example, electronically erasable programmable read only memory ("EEPROM"). The memory 240 may be configured to store data related to toner usage and/or toner remaining. The toner cartridge 235 may be configured for communication with the ASIC 225.

Figure 3:
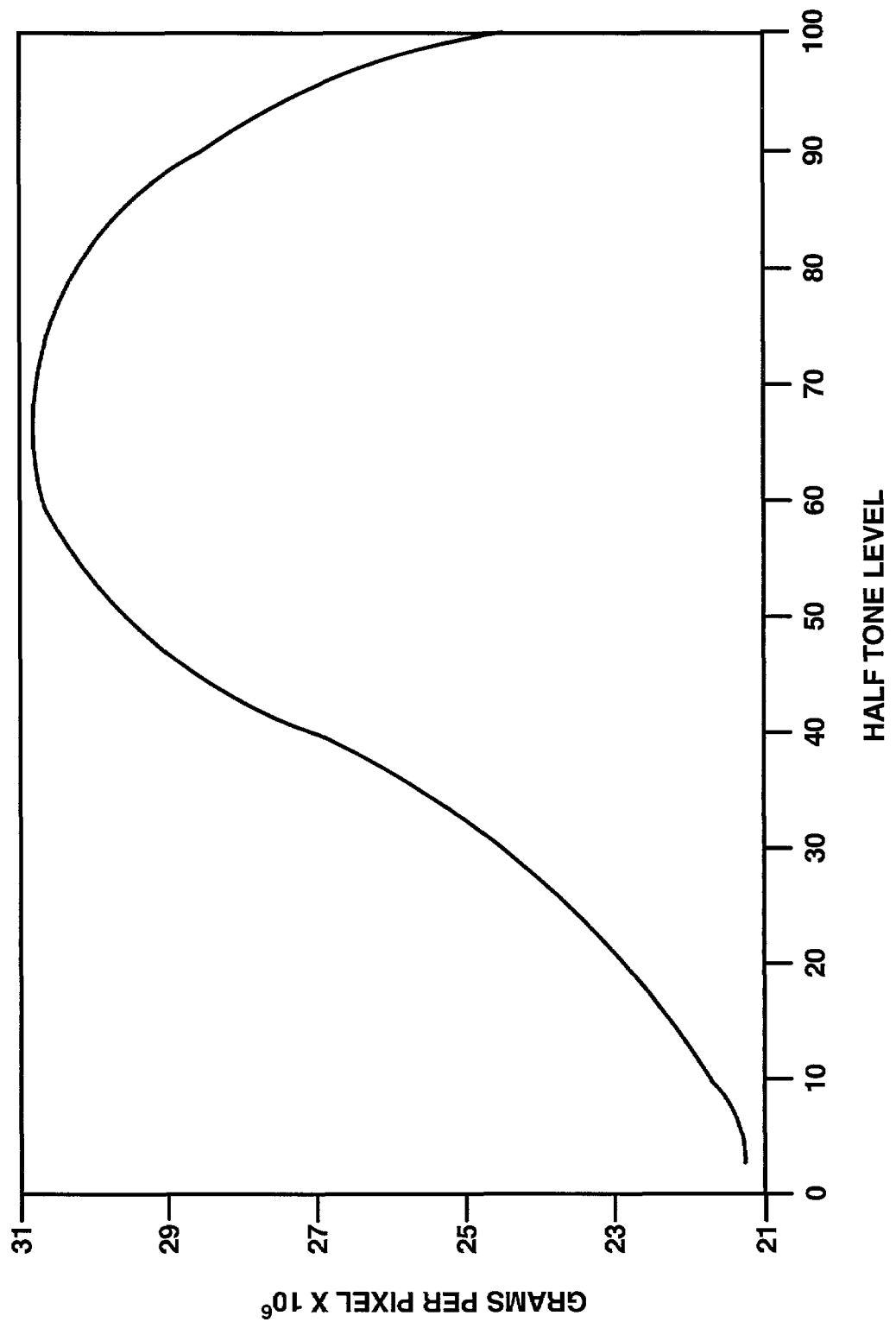
FIG. 3 is a graph, in accordance with an embodiment of the invention described in FIG. 1, of half tone level (abscissa) as it effects the weight, in grams, of $10^6$ pixels (ordinate).

FIG. 3 is a graph, in accordance with an embodiment of the invention described in FIG. 1, of half tone level (abscissa) as it effects the weight, in grams, of $10^6$ pixels (ordinate). As shown in FIG. 3, the edge effect non-linearity may be plotted in terms of weight of toner transferred to the printing media. Toner transfer is shown to rise as the half tone level rises from about half tone level of 2% until about half tone level of 70%. Shortly thereafter, toner transfer is shown to decrease as the half tone level continues to rise from about half tone level of 72% until about half tone level of 100%. Thus, in terms of toner usage per pulse width, a correction factor based on a function of the curve may be used to adjust the PWC.

Additionally, it is to be understood that the invention is not limited to a function of the graph illustrated in FIG. 3, but rather, the invention may include any reasonable function correlating toner usage to half tone level. Accordingly, the graph depicted in FIG. 3 is for illustrative purposes only and thus is not meant to limit the present invention in any respect.

Moreover, the correction factor is determined based upon system design, empirically determined data, etc. In general, the correction factor may depend upon one or more of the following factors: system application, laser specifications, printer head specifications, toner or ink characteristics, OPR parameters, optimization of the system, environmental factors, etc.

The method 100 may exist in a variety of forms both active and inactive. For example, they may exist as software program(s) comprised of program instructions in source code, object code, executable code or other formats. Any of the above may be embodied on a computer readable medium, which include storage devices and signals, in compressed or uncompressed form. Exemplary computer readable storage devices include conventional computer system RAM (random access memory), ROM (read only memory), EPROM (erasable, programmable ROM), EEPROM (electrically erasable, programmable ROM), flash memory and magnetic or optical disks or tapes. Exemplary computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims—and their equivalents—in which all terms are meant in their broadest reasonable sense unless otherwise indicated.

What is claimed is:

1. A method for correcting a half tone pulse width count, the method comprising:
   determining the half tone pulse width count, the half tone pulse width count being a measure of the accumulated widths of a plurality of pulses associated with the printing of a plurality of half tone pixels;
   determining a halftone level;
   calculating a corrected half tone pulse width count based on the accumulated half tone pulse width count and the half tone level;
   determining a pulse width count; and
   calculating a toner usage value based on the pulse width count and the corrected half tone pulse width count.

2. The method of claim 1, wherein at least one of the half tone pulse width count, the half tone level and the corrected half tone pulse width count may be determined for one or more of a pixel, a line, a page, a print job, and a usable lifespan of a toner cartridge.

3. The method of claim 1, wherein one or both of a statistical regression equation and a lookup table are used for the calculating step.

4. The method of claim 3, wherein the lookup table is based on the statistical regression equation.

5. The method of claim 1, further comprising:
   calculating a toner remaining value based on a predetermined amount of toner and the toner usage value.

6. A computer readable medium on which is embedded program instructions capable of automatically correcting a half tone pulse width count, the program instructions comprising instructions for:
   determining the half tone pulse width count, the half tone pulse width count being a measure of the accumulated widths of a plurality of pulses associated with the printing of a plurality of half tone pixels;
   determining a halftone level;
   calculating a corrected half tone pulse width count based on the accumulated half tone pulse width count and the half tone level;
   determining a pulse width count; and
   calculating a toner usage value based on the pulse width count and the corrected pulse width count.

7. The computer readable medium of claim 6, wherein at least one of the half tone pulse width count, the half tone level and the corrected half tone pulse width count may be determined for one or more of a pixel, a line, a page, a print job, and a usable lifespan of a toner cartridge.

8. The computer readable medium of claim 6, wherein one or both of a statistical regression equation and a lookup table are used for the calculating step.

9. The computer readable medium of claim 8, wherein the lookup table is based on the statistical regression equation.

10. An apparatus for correcting a half tone pulse width count comprising:
    a processor system configured to determine the half tone pulse width count, the half tone pulse width count being a measure of the accumulated widths of a plurality of pulses associated with the printing of a plurality of half tone pixels, wherein the processor system is further configured to determine a half tone level for the one or more pixels and wherein the processor system is further configured to calculate a corrected half tone pulse width count based on the half tone pulse width count and the half tone level, determine a pulse width count for one or more substantially solid pixels within a print job, and calculate a toner usage value based on the pulse width count and the corrected half tone pulse width count.

11. The apparatus of claim 10, wherein the processor system comprises at least one processor associated with one or more of a PC, a print spooler, a printer and a network component.

12. The apparatus of claim 11, wherein the processor system is an application specific integrated circuit contained within the printer.

13. The apparatus of claim 10, further comprising a memory, the memory configured to store one or more of the toner usage value, the corrected half tone pulse width count, the half tone pulse width count, the half tone level, and the pulse width count.

14. The apparatus of claim 13, further comprising a toner cartridge, the toner cartridge configured to hold a predetermined amount of toner and dispense measured amounts of toner as required.

15. The apparatus of claim 14, wherein the processor system is further configured to calculate a toner remaining value based on the predetermined amount of toner and the toner usage value.

16. The apparatus of claim 15, wherein the toner cartridge comprises a non-volatile memory, whereby the non-volatile memory is configured to store data associated with one or more of the predetermined amount of toner, the toner remaining value and the toner usage value.

* * * * *

UNITED STATES PATENT AND TRADEMARK OFFICE
CERTIFICATE OF CORRECTION

| | |
|---|---|
| PATENT NO. | : 7,142,331 B2 |
| APPLICATION NO. | : 09/928503 |
| DATED | : November 28, 2006 |
| INVENTOR(S) | : Santiago Rodriguez |

It is certified that error appears in the above-identified patent and that said Letters Patent is hereby corrected as shown below:

In column 7, line 59, in Claim 1, delete "halftone" and insert -- half tone --, therefor.

In column 8, line 2, in Claim 2, delete "page." and insert -- page, --, therefor.

In column 8, line 21, in Claim 6, delete "halftone" and insert -- half tone --, therefor.

Signed and Sealed this

Second Day of December, 2008

JON W. DUDAS
*Director of the United States Patent and Trademark Office*